United States Patent

[11] 3,613,071

[72] Inventor Roy G. Quay
San Antonio, Tex.
[21] Appl. No. 888,044
[22] Filed Dec. 24, 1969
[45] Patented Oct. 12, 1971
[73] Assignee Petty Geophysical Engineering Company
San Antonio, Tex.

[54] SIMULTANEOUS DUAL SEISMIC SPREAD CONFIGURATION FOR DETERMINING DATA PROCESSING OF EXTENSIVE SEISMIC DATA
13 Claims, 6 Drawing Figs.

[52] U.S. Cl. .................................................. 340/7,
340/15.5 MC
[51] Int. Cl. ..................................................... G01v 2/16
[50] Field of Search ........................................... 340/15.5
MC, 7

[56] References Cited
UNITED STATES PATENTS
2,757,356  6/1956  Haggerty ...................... 340/7
2,759,551  8/1956  Carlisle et al. .................. 181/.5
3,096,346  7/1963  Savit et al. ..................... 340/15.5

Primary Examiner—Rodney D. Bennett, Jr.
Assistant Examiner—N. Moskowitz
Attorney—Watson, Cole, Grindle & Watson ABSTRACT: Signals from the same seismic source are simultaneously recorded from two groups of seismic detector arrays. The two groups have detector arrays and array intervals unique to each group. The group closest to the seismic source accentuates shallow reflections and is characterized by: (1) closely spaced detectors in each array forming short arrays with short distances between array centers, (2) nearness to the source, (3) usually sampled and filtered to resolve high-frequency data, and (4) a low order of multiple coverage. The group more remote from the seismic source enhances the deeper reflections and is characterized by: (1) long arrays with long distances between array centers, (2) a location a mile or two from the source, (3) sampling and filtering to resolve low-frequency data, and (4) a high order of multiple coverage. A factor, i.e., number of detector arrays times the spacing between array centers divided by the multiplicity of coverage, for one group must be equal to the corresponding factor for the other group, although the multiplicities of coverage of the two groups are very different. The near group data determines the processing techniques and corrections for the mass of data from the far group.

INVENTOR
ROY G. QUAY
BY Watson, Cole, Grindle & Watson
ATTORNEYS

FIG. 2
SPREAD SEQUENCE

▽ SOURCE LOCATION
○ DETECTOR LOCATION (a) A 11 ○○○○○ 16    17 ○    ○
(b) B 11 13 16    17    19
(c) C 11 ○○○○○ 16    17    19
(d) D 11 ○○○○○ 16    17    ○    ○    20
(e) E 11 ○○○○○ 16    17    ○    ○    20
(f) F 11 ○○○○○ 16    17    ○    ○    21
(g) G 11 ○○○○○ 16    17    ○    ○    ○    21
(h) H 11 ○○○○○ 16    17    ○    ○    ○    ○    22

FIG. 3

▽ SOURCE LOCATION
○ DETECTOR ARRAY CENTER
• REFLECTION POINT

INVENTOR,
ROY G. QUAY
BY Watson, Cole, Grindle & Watson
ATTORNEYS

▽ SOURCE LOCATION
○ DETECTOR LOCATION
· COMMON REFLECTION POINT

INVENTOR,
ROY G. QUAY
BY Watson, Cole, Grindle & Watson
ATTORNEYS

SIMULTANEOUS DUAL SEISMIC SPREAD CONFIGURATION FOR DETERMINING DATA PROCESSING OF EXTENSIVE SEISMIC DATA

This invention relates to seismic surveying and, more specifically, to a method and apparatus for providing dual series of seismic detector arrays. The invention disclosed herein is primarily useful in marine seismic exploration; however, those skilled in the art will recognize that it can be employed with suitable modification for seismic exploration on land. In marine seismic exploration it is customary to use a cable which contains pressure-activated devices for detecting seismic signals. It is likewise customary to have such a cable deployed behind a seagoing vessel for the purpose of detecting the seismic signals generated on or near the vessel by any number of known sources or devices. Such pressure-activated detectors are arranged in an array, or pattern, as, for example, described by Parr in U.S. Pat. No. 2,698,927 or Kearns in U.S. Pat. No. 3,335,401. The output of a group of individual detectors in an array is then recorded on a given channel. A series of 24 or more arrays are usually uniformly spaced along the cable.

In accordance with the present invention, a marine cable simultaneously employs two groups of detector arrays, each of these groups has detector arrays and intervals between array centers different from the other array. The longer group of detector arrays is the type commonly used for multiple coverage. It must be long enough to attenuate undesired multiple reflections. Frequently, this group extends for 2 miles from the source and consists of 24 detector arrays with a 440 -foot spacing between array centers. The detectors in each array are distributed over most of this 440 -foot interval to attenuate low-frequency (long wavelength) noise transmitted along the the spread. A shorter group of detector arrays may consist of six detector arrays with about 73 feet between array centers. The detectors in each array are distributed over most of this 73 -foot interval. The total length of this array group in the above example is less than 440 feet. A longer array is not required for this short group because the low frequencies may be removed by electrical or digital filters or other means described herein. The 440-foot array, used for the longer group, would be too long to detect the high-frequency component of the shallow reflections; the signals from the source to shallow reflecting horizons and back to the various detectors in this long group would be out of phase and severely attenuated when combined within a given detector array.

The shorter group is placed as close as practical to the seismic source. In this manner, the normal moveout (NMO) is very small and even if the velocity of seismic propagation to the reflecting horizon is not properly known, any error in velocity would introduce only negligible differences in NMO. The use of a higher frequency pass band for the short spread also permits placing the shorter group closer to the seismic source and a shorter array than would be possible of a low-frequency pass band were used. Seismic recordings containing high frequencies are desirable since they provide greater resolution of the shallow reflections than would be possible with low frequencies. Greater resolution is particularly desirable in marine exploration since the strata immediately below the water bottom consists of thin layers and the velocity, low in nature varies quite rapidly from place to place due to various geological phenomena. For example, there are numerous ancient river channels filled with silt and other debris which cause rapid changes in sub-bottom formations. A further advantage of the shorter group is that the reflection points recorded therein will be closer together than if the longer spread were used. This permits mapping the low-frequency in sub-bottom conditions in greater detail and reduces the possibility of ambiguity because of rapid changes in reflection time. Such ambiguity does not allow the reflections to be correlated from one channel to another. The shorter group radically contrasts with the longer group which is from a mile to 2 miles in length and which detects the low-frequency components of the seismic signals. The well-known horizontal stacking techniques are required for the longer group to attenuate multiple reflections from shallow reflecting horizons. Multiple reflections overlap the desired primary reflections from deeper reflecting horizons. In general, twelvefold to twenty-fourfold coverage is used in most marine seismic exploration. This means for every common reflection point on the composited section there are at least 12 to 24 separately recorded channels which have been combined. The processing of this data from the longer group requires some type of correction guide to expedite the processing of the data in a digital computer. The limited amount of data from the shorter group is used to determine the static correction due to the weather layer below the bottom and also serves as a guide to the complex processing of the mass of data from the longer group.

The present invention provides the capability of simultaneously yielding two different folds of seismic coverage, e.g. single coverage (onefold) with a larger fold, such as twenty-fourfold coverage. By a systematic arrangement of the source interval, the single coverage may become a higher fold (two, three, etc.).

It is a primary object of this invention to provide for the simultaneous recording of different folds of seismic coverage wherein onefold coverage is obtained from a group of detector arrays which enhances signals from shallow reflections and the other fold coverage is determined from a group of detector arrays which enhances deep reflections.

It is a further object of this invention to provide an improved method and apparatus for enhancing deep reflections obtained from a marine seismic survey.

The foregoing objects and advantages will be more clearly understood from the following description when taken in conjunction with the drawings wherein:

FIG. 2 illustrates the sequence of successive source and detector array locations for the method and apparatus of the invention;

FIG. 3 is illustrative of the subsurface coverage of successive source locations using the dual group configuration in accordance with the invention wherein the source locations are systematically spaced so as to simultaneously yield a singlefold coverage plus a multiplefold coverage;

Figure 1A:
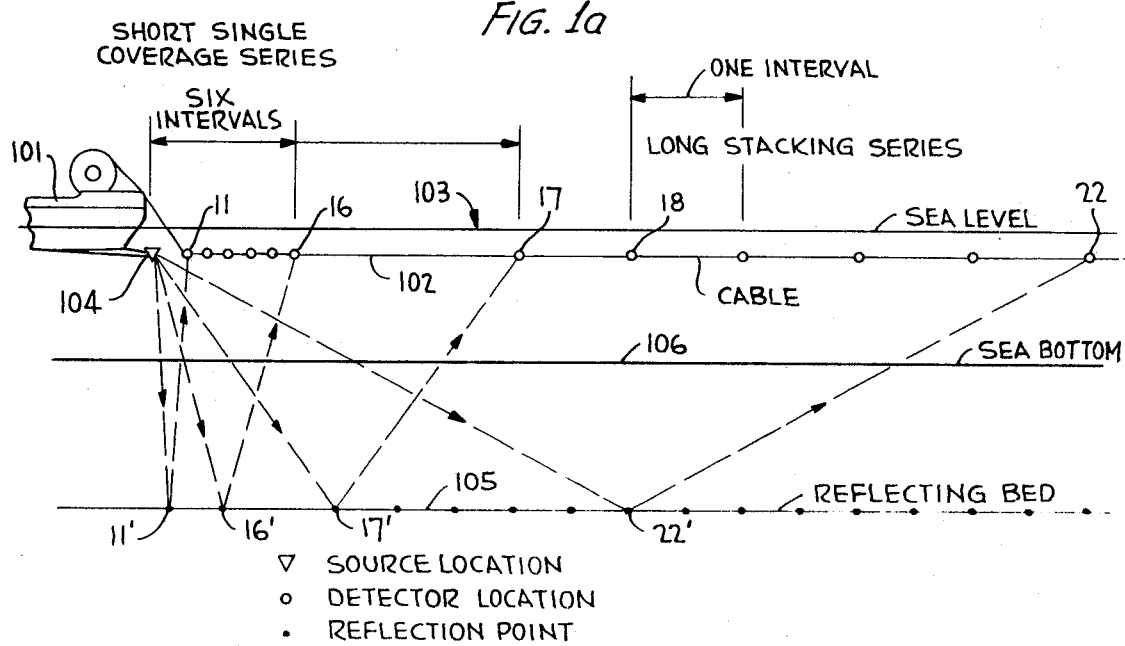
FIG. 1a illustrates a seismic cable having two groups of detector arrays arranged according to this invention and also represents the subsurface coverage for any given source location.

In the following description, 24 stations are used to illustrate the principles of the invention. However, it is to be understood that the invention may be applied to any given number of detector arrays.

With respect to FIG. 1a boat 101 tows cable 102 at a selected depth below the water surface 103. Centers 11-22 of geophone array shown along cable 102 and other centers 23-24 are on the cable to the right of the illustrated cable segment. The spacing between array centers 17-34 is large, such as 440 feet, so that undesired multiple reflections are attenuated by using the horizontal stacking techniques known to the seismic art. An appreciable number of seismic detectors, such as 30 are distributed along the cable symmetrically from the array center 17 and extend nearly half of the distance to the next array center 18. Similar arrays of seismic detectors are distributed on the cable 102 about array centers 18-34. This group of seismic detector arrays is hereinafter called the longer group. A seismic source 104 radiates a seismic impulse into the water and signals received by the longer group 17-34 are transmitted along conductors in cable 102 to recording equipment in boat 101. The raypaths are shown for seismic energy from source 104 down to reflection points 17' and 22' on reflecting formation 105 and then up to arrays 17 and 22. These paths are through the sea down to the sea bottom 106 and then through various layers below the sea bottom. These raypaths are illustrated for only one of many reflecting formations.

A shorter group of seismic detector arrays are distributed about array centers 11–16. This shorter group may be on the same cable 102 as the longer group or on a separate nearby cable, not illustrated. Reflection raypaths are shown from the source 104 down to reflection points 11' and 16' and back up to arrays at 11 and 16. The spacing of these arrays must by proper for the number of arrays and the multiplicity of coverage, as discussed hereinafter.

The spacing between detector arrays and the number of arrays in a group is determined by the equation:

(1) $N_1 \times D_1/M_1 = N_2 \times D_2/M_2$

Subscript 1 denotes the shorter group and subscript 2 denotes the other series; $N$ is the number of detector arrays in the group; $D$ is the distance between centers of arrays; and $M$ is the multiplicity of coverage obtained. In this case, if there are 18 arrays in the longer group with 440 feet between centers, the shooting procedure is to obtain eighteenfold coverage from the longer group. If there are six arrays in the shorter group and singlefold coverage is desired from that group, the spacing $D_1$ is determined from equation (1) as:

$6 \times D_1/1 = 18 \times 440$ feet $/18$ or $D_1$ is approximately equal to 73.3 feet.

The spacing of the detectors in an individual array is determined by standard operating techniques based on the frequency range of the pass band of the recording system. The shorter group uses high frequencies so the detectors in an array are close together and extend over a limited distance to record the shallow high-frequency reflections without appreciable attenuation. The longer group has a lower frequency response so the detectors are farther apart, but they must be distributed over several hundred feet in order to attenuate the low-frequency (long wavelength) noise.

In order to properly record the high frequencies in the shorter group, it is preferred to have the high-cut filter at a higher cutoff frequency than normal, such as 300 Hz., and to use a 1-millisecond sample rate for the seismic signals from each array. For the deep reflections from the longer series, it has been common to use a 75 Hz. high-cut alias filter and a 4-millisecond sample rate for the seismic signals from each array.

As has been discussed previously, the shorter group provides a better resolution of shallow data and accommodates the high-frequency components of the various reflections. Thus, the static corrections are accurately determined to enhance the output information obtained for the longer group for obtaining multiple coverage. Furthermore, the significant increase in resolution of the shallow data obtained by the shorter spread provides an optimum representation of the geologic formations adjacent to the sea bottom.

Within the present invention, there are several advantages which will be evident to those skilled in the art. First, my invention will enable the seismologist to examine the shallow reflecting horizons through more closely spaced reflections points while also recording the deeper reflections, through the longer interval group, for the compositing of reflections in the stacking process. Furthermore, the higher frequencies reflected by the shallow reflecting horizons will be recorded for observation in the form of singlefold or other low multiplicities of coverage. Finally, the seismologist, by a utilization of the present invention, can obtain a substantial reduction in seismic data processing corrective techniques by relaying upon information obtained from his study of the common reflection points of the low multiplicity coverage as a guide to the best method and mode of processing the high multiplicity coverage recorded from the longer group.

In order to attenuate second and higher order reflections, commonly referred to as multiple reflections, and also to accentuate primary reflections, the length of the longer group must be at least 1 mile in length and it may extend 1½ or two miles in length. Thus, in a 24-array group, each detector array interval would range approximately from 220 feet to 330 feet to 440 feet, respectively.

In areas where the geologic formations are inclined at high angles, i.e., the subsurface layers are inclined at an appreciable angle with respect to the horizontal surface, as shown by Mayne, Oil & Gas Journal, Sept. 29, 1969, the distance between reflection points must be greatly decreased to permit resolution of steeply dipping reflecting horizons. Thus, the corrected time from one reflection point to the next or adjacent reflection point may be one-half the time involved to record a given signal frequency, i.e., the corrected time from one reflection point to the next reflection point may be one-half of one cycle of the given signal. This correction time might also be more than one-half cycle of the particular signal.

To those skilled in the art, the fact that the subsurface layers have varying velocities is obvious. Furthermore, it is a well-established fact that the lower velocity layers are adjacent to the sea bottom. Therefore, if large variations in the low velocity zone exist over relatively short lateral distances along the traverse, correlation of the common reflection points may be ambiguous and totally misleading. This ambiguity would exist in the shallow reflecting horizons and would result in a given reflection being shifted more than one-half of one cycle between two adjacent reflection points. A reduction in the distance between adjacent reflection points can resolve this ambiguity.

To achieve this reduction in horizontal distance between two given reflection points, there are several possible approaches: first, by a closer spacing of the source locations, i.e., a reduction in the horizontal distance between adjacent reflection points can be accomplished; furthermore, a reduction in the detector locations, i.e., a reduction in the detector interval, or, as commonly referred to, the spread interval; finally, a reduction in the distance between adjacent reflection points can be resolved by combining the heretofore mentioned techniques. For example, a decrease in the source interval and a decrease in the detector interval can result in a reduction in the distance between adjacent reflection points. Thus, the need for a dual group configuration is realized and can be accomplished by the embodiment herein and the exploitation of the present invention.

In actual practice, the array of detectors which are sued as a group for recording the higher frequency components of the shallow reflections cannot physically be spread over as long a distance as that which is required to attenuate noise in the low frequencies of the deeper reflections. The higher frequency components of the shallow reflections can readily be recorded, without great difficulty, on a few channels, e.g., detector arrays 11 through 16 of FIG. 1a. It is noteworthy that in utilizing the above-mentioned method of recording, a large number of recordings, i.e., a great mass of data, need not be recorded. Normally, the seismic recording channels are sampled only at the time limit which borders on deterioration of the highest frequencies of the deeper reflections. Thus, the sample rate of 4 milliseconds is used, i.e., each of the seismic recording channel is sampled ever 4 milliseconds. However, in some circumstances, a given set of conditions may demand a 1-millisecond or a 2-millisecond sample rate. In order to record the higher frequency components of the shallow reflections, it is necessary to sample each of the seismic recording channels at a high rate, i.e., preferably at every 1 millisecond. It is well-known that less differential moveout can be tolerated for st stacking higher frequencies; however, more differential moveout is actually encountered from shallow reflections for the same source-to-detector distance. This fact is well illustrated by FIG. 1b. Moreover, high-frequency reflections are usually better from a nearly vertical path and are very poor at wide angles. Such an arrangement is illustrated in FIG. 1a, wherein the paths to arrays 11–16 are more desirous for the high-frequency shallow reflections.

Because reflections received by the shorter group follow near vertical raypaths, discrepancies in velocity do not appreciably alter the true reflection times. Thus, the need for a high degree of accuracy in velocity when processing the common reflection point traces is not acute. In reality, if the shorter group approaches the ideal configuration for the given set of circumstances, no time variable corrections will be necessary. Upon the inspection of the seismic data recorded by the shorter group, the data will illustrate any steeply dipping beds; any abnormal weathering layers, i.e., areas of large differential velocities; any severe reverberation; and any other noise. Thus, the seismic data recorded by the longer group can be subjected to the appropriate guidelines as determined by the shorter group. The seismologist, by examination of the seismic data resulting from the shorter group and from the longer group, can compare the two sets of data and determine the appropriate corrections for the seismic data recorded by the longer group.

The deeper reflections are predominantly of a low frequency and therefore require that the elements in a detector array be spread over greater distances in an effort to attenuate the horizontally propagated low-frequency energy that results in the distortion and destruction of meaningful data from a subsurface common reflection point. Frequency filtering generally cannot be used to attenuate such undesired low-frequency noise since the frequency of the noise lies within the range of useful reflections received from the deeper formations and, consequently, it is necessary to have the longer array to attenuate the long wavelength, low-frequency noise, and to accentuate deeper reflections.

Multiple reflections are known to be severe when the low-frequency deeper reflections are received, and a combination of reflections from appreciably different angles is the preferred procedure to attenuate the low-frequency components of the reflections and to accentuate and enhance the valid deeper primary reflections. The time differential between primary reflections and multiple reflections must be comparable to, or greater than, the longest period in the multiple reflections to adequately attenuate the multiples. Similarly, when the velocity gradient is small, the spread differential must be great to attenuate unwanted signals. Therefore, the longer group represented by detector array stations 17–34 is necessary.

Figure 1B:
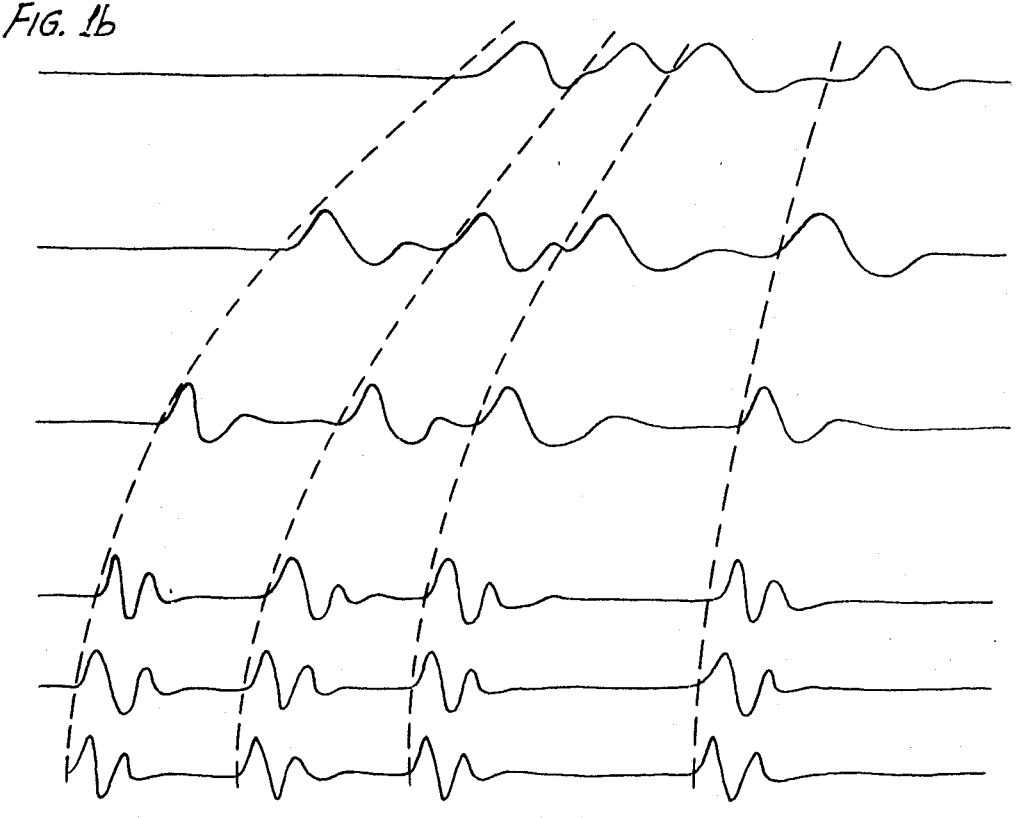
FIG. 1b illustrates the varying degrees of normal moveout obtained from one source location with segments of both groups of detector arrays as used in FIG. 12.

If the overall spread length of the dual series configuration is not sufficient for multiple suppression, extension sections may be inserted between the shorter and longer groups, i.e., between detector array stations 16 and 17 as illustrated in FIG. 1a. Such extension sections would not contain any detectors. Thus, the distance between the shorter and longer group detector configurations may be varied to suit a given set of conditions or to accommodate the specific needs of the seismologist.

In recording the seismic information, the shorter group, for limited coverage, may be recorded on another set of instruments so that instrumentation and techniques applicable to the peculiarities and characteristics of each group may be utilized, for example, different filters and response equipment for each group. Furthermore, there may be two cables and two recorders, or one cable and one recorder. Likewise, any additional combination worthy of a given set of circumstances may be utilized as desired.

FIG. 2 illustrates successive source locations and group configurations. The pattern illustrated for the longer group is in accordance with that of W. Harry Mayne as set forth in the Dec. 1962, issue of Geophysics, Volume 27, No. 6, at pages 927–938. FIG. 2a illustrates the position of the source at A, the closer group consisting of detector arrays 11–16 and a portion of the longer group represented by detector arrays 17 and 18. In offshore use, the seismic source generally generates a seismic signal as the cable assembly is being pulled through the water. However, to simplify the present discussion, the Figure represents the conditions as if the cable were motionless in the water when the source is excited. When the cable has been advanced the proper distance along the traverse, the source is excited at source location B as illustrated in FIG. 2b. In this particular case, detector array station 13 is at the former source location A. A longer interval could be selected between the source and detector array 11; the interval illustrated is merely convenient for the illustration. Successive source locations along the traverse are illustrated in FIGS. 2c through 2h by source locations C through H, respectively.

FIG. 3 illustrates the location of reflection points obtained from a series of seismic sources along a traverse for the source and detector array locations in FIGS. 1a and 2. FIG. 3a is similar to FIG. 1a, but is drawn at the same horizontal scale as the remainder of FIG. 3. The signals received by the arrays from source A are recorded. In FIG. 3b, the reflection points are along the same traverse but placed lower in the Figure for clarity. The seismic source and detector arrays have been moved left so that the source is at B. The distance between A and B is one-half of the distance between consecutive detector array centers 17 and 18 in the longer group. This distance places the reflection point B–18 from source B to detector array 18 at the same location along the traverse as reflection point A–17 from source A to array 17. Similarly, reflection point B–19 is at the same point as reflection point A–18 and so on to B–34 at the same point as A–33 (B–34 and A–33 are not shown in the Figures). The signals received by the detector arrays from source B are recorded. The source and detector arrays are moved, shifting the reflection points as illustrated in FIG. 3c, and recording made from source C. The process is repeated down the traverse as illustrated in FIGS. 3d–3u. Reflection points A–17, B–18, C–19,...,R–34 are at the same point hence common reflection point (CRP) and is indicated as CRP–1. Other CRPs are shown such as CRP–3 consisting of C–17–T–34. The data from each CRP is corrected for path length and then combined by the process of horizontal stacking. The source and all of the detector arrays are moved along the traverse a distance equal to one-half of the distance between detector array centers in the long group, the source excited and the data received by the detectors is recorded, and the process is repeated along the traverse. This process results in a multiplicity of coverage in the longer group which is equal to the number of detector arrays in that group. In this case, eighteenfold coverage in the long group is obtained from the 18-detector arrays in the longer group While this has been illustrated with cable and sources at rest during the recording, both could be in continuous movement through the process. The reflection points resulting from deeper reflections would be shifted laterally in time along the traverse, but only to a small degree.

In FIG. 3a, seismic energy from source A is reflected at reflection point A–16 to detector array 16. Similar reflection points exist for detector arrays 11–15. The path for seismic energy from source A to reflecting point A–11 and to array 11 is illustrated. Reflection points A–16–A–11 are uniformly spaced along the profile since the detector arrays 11–16 are uniformly spaced. The source is moved to B as shown in FIG. 3b and reflection points B–16–B–11 are obtained. If the spacing between array centers is selected as previously described, the distance from reflection point A–11 to reflection point B–16 will be the same as the distance between other consecutive reflection points, such as A–12 to A–11.

Detector arrays 11–16 are used to obtain singlefold coverage simultaneously with the high multiplicity of coverage from detector arrays 17–34.

The mass of data involved is tremendous; each individual sample may contain 18 binary bits in floating point form; there may be fifteen hundred to three thousand samples per reflection point; and in the illustration, there are 18 reflection paths per common reflection point, with another CRP every 220 feet along the traverse; and at reasonable boat speeds this distance is covered in 22 seconds. This could be about 1 million bits of binary, floating point, raw data collected every 22 seconds. The work done in processing this mass of raw data is fantastic, for example, an autocorrelation of just one sample includes three thousand times three thousand or 9 million multiplications, additions, and then these samples must be stored.

According to my invention, the processing accuracy can be greatly improved with a fantastic reduction of time and equipment. This includes the recording of the data from a shorter group of seismic detector arrays simultaneously with the recording of the data from the longer group of seismic detector arrays. As previously discussed, the number of arrays, the distance between array centers and multiplicity of coverage on the shorter group must be appropriate for the same factor in the longer group. Other features between the groups are different as previously described. The spacing in the shorter group for the array centers 11–16 is shown in FIG. 3a. The total distance from array center 11 to array center 16 in the shorter group is less than the distance between consecutive array centers, such as array centers 17 to 18, in the longer group. This provides a series of reflection points A–11–A–16. For the illustrated arrangement reflection point A–16 is at CRP-3, although by shifting the entire shorter group along the cable any desired reflection point on the shorter group is made to coincide with the CRP of the long spread. Single coverage on the shorter group is illustrated in FIGS. 1, 2 and 3, that is, each reflection point in the shorter group is recorded only once. These reflection points are uniformly spaced along the traverse such as from reflection point A–11 to A–12 and from B–16 to B–11. Therefore, six detector arrays for the shorter group are used, but data from six times as many reflection points, as recorded from the longer groups has been obtained. Furthermore, the shallow data from the shorter group is superior to the shallow data from the longer group, because better shallow reflections are obtained from near vertical raypaths. The high frequencies required for good resolution can be obtained by frequently sampling the data; hence it is very desirable to process only selected data, not the entire mass of data. Small moveout (NMO) on the shorter group permits excellent NMO corrections due to little or no signal distortion. Variations in time are due to dipping formations or weathering on the seismic recordings which have had NMO removed. The continuous repetition of the shorter group along the traverse permits determination of weathering by removal of the dip. The short arrays do not smear or average the subsurface nor does it attenuate high-frequency reflections.

Figure 4:
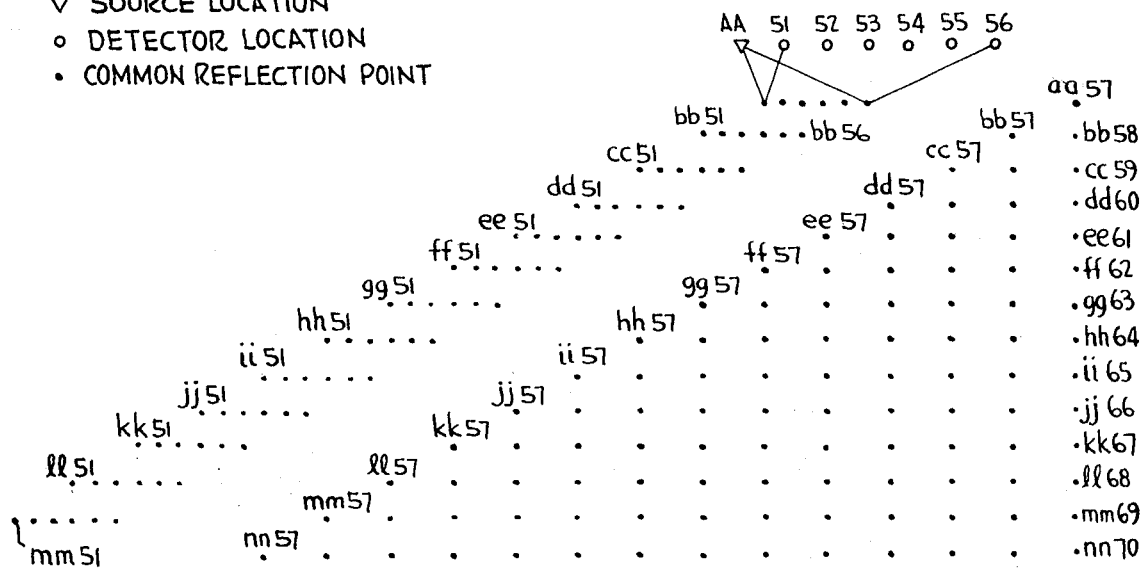
FIG. 4 illustrates an alternative configuration for the marine dual group of detector arrays in accordance with the configuration of FIG. 3.

FIG. 4 illustrates twofold coverage resulting from the shorter group, while the longer group affords an eighteenfold coverage. By utilizing equation (1), the spacing between detector arrays and the number of arrays can be determined. In the cited example, FIG. 4, if there are 18 detector arrays in the longer group with 440 feet between array centers, the shooting procedure will result in eighteenfold coverage from the longer group Thus, if there are six detector arrays in the shorter group and twofold coverage results from this group, equation (1) yields the following:

6 $D_1/2 = 18 \times 440$ feet/18 or $D_1$ is approximately equal to 146.7 feet. Twice the detector array spacing for the shorter group of FIGS. 1a, 2, and/or 3 is required in FIG. 4 to result in twofold coverage, all other factors remaining constant.

In a given set of circumstances, the detector array length for the shorter group remains constant, and the number of detector arrays is increased. Thus, the results are uniform with the heretofore mentioned FIG. 4. By algebraic expression:

$N_1 \times 73.3$ feet/2 = $18 \times 440$ feet/18, or $N_1 = 12$.

Hence, twofold coverage in the shorter group is achieved by alteration of either the number of detector arrays or alteration of the distance between detector array centers or alteration of both.

Thus, if a multiplicity of coverage higher than singlefold coverage is desirous in the shorter group, it can easily be achieved. If, however, at a later date, the seismologist desires only singlefold coverage and a higher multiplicity of coverage has been recorded, the appropriate channels may be deleted in the data processing of the seismic channels. Such a process is much more feasible than reexploring the same traverse.

The fact is emphasized that in the heretofore mentioned formula, $N$ does not refer to those detector arrays which may or may not be used as common detector arrays to two or more group configurations. I.e., these detector arrays are not "tie" detector array groups. Likewise, it is noteworthy that $N$ does not refer to any overlapping of detector groups from one group configuration to any subsequent group configuration.

Figure 5:
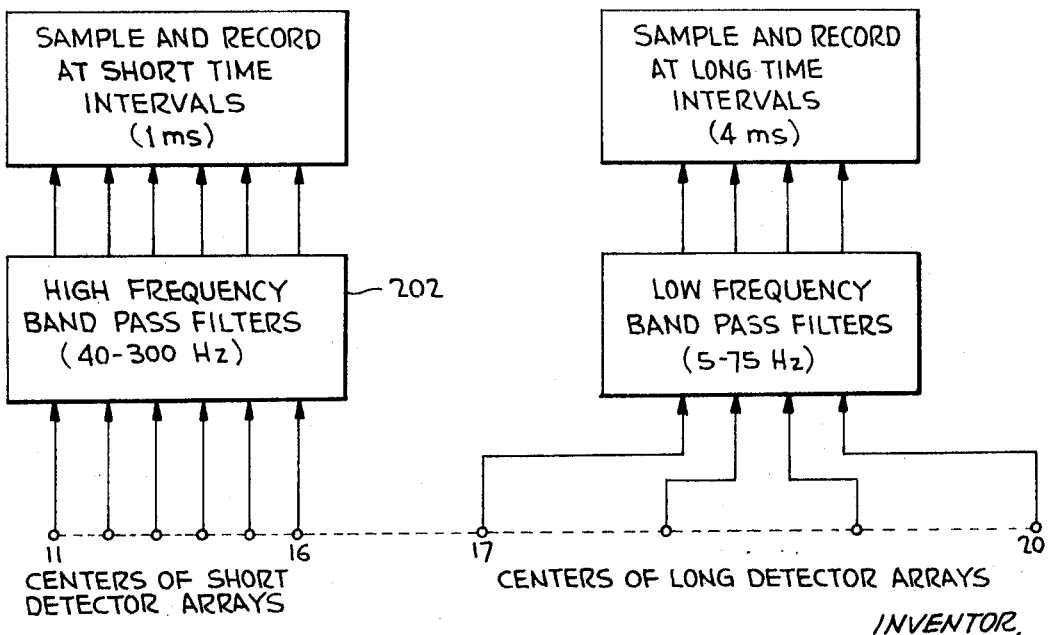
FIG. 5 illustrates the different filters and recoding systems for the shorter and longer groups of detector arrays.

FIG. 5 illustrates, in block diagram format, suitable recording apparatus wherein the centers of the long detector arrays are indicated at 17–20. Each of these detector arrays may consist of 30 or more detectors distributed over a distance of a few hundred feet. The signals from all of the detectors in an array are combined and transmitted by conductors to the recording station, on a boat in the case of a marine operation. The signals from each detector array such as 17 are filtered through an appropriate filter selected in accordance with the properties of the area and the depth of the zone of interest. If the zone of interest is typical of present seismic exploration for oil (maximum record time about 6 seconds), the filter pass band may be in the order of 5 to 75 Hz. and in this case a sample of each array every 4 milliseconds would suffice. If the zone of interest was shallower, a higher frequency pass band would generally be preferred. The centers of the short detector arrays are indicated at 11–16. Each of these detector arrays may consist of 20 detectors distributed over a distance of 40 to 80 feet. The signals from all of the detectors in an array are combined and transmitted to the recording station on the boat. The signals from each detector array such as 11 are filtered through an appropriate filter selected in accordance with the depth of the water, properties of the area, and purpose of the survey. Again, in the seismic exploration for oil, this filter might be 40 to 300 Hz. and the signal from each detector array would be sampled every 1 millisecond.

If the purpose of the survey is to locate shallow minerals or other objects at shallow depths, both arrays are shortened and higher frequencies used. If the target is very deep, the arrays and lower frequencies are used.

There are several points that should be noted in the illustrated disclosure of FIGS. 1–3. The combined overall length of all of the detector arrays in the shorter group is less than the center-to-center distance of two consecutive arrays in the longer group. In this case, it means that six times as many reflection points are obtained from the shorter group as from the longer group of detector arrays. This makes it possible to map the sediments immediately below the bottom at six times as many locations as with the longer group, therefore in much greater detail and avoiding the ambiguity due to the rapid changes in depth or weathering.

The second point is that with a single series of shots, it is possible to simultaneously record both a low multiplicity of coverage for the shallow reflections and a high multiplicity of coverage for the deeper reflection. This is a requirement for the removal of undesired multiple reflections from the desired deep primary reflections by the process of horizontal stacking.

A further advantage of this invention is that data from the shorter group of detector arrays may have an approximate NMO correction applied and then used as true time. This is possible since all of the detectors in the shorter group are near the seismic source, hence NMO corrections are very small and generally NMO errors are negligible. This is not possible for data from the longer group of detector arrays, since there are very large values of NMO and hence large errors in NMO due to the assumption of a vertical velocity. Static corrections computed from data obtained with the shorter group are applied to the longer group of detector arrays. Then the NMO and average velocities are determined automatically for the seismic data derived from the longer group.

A further use of the shorter group of detector arrays is that the output of either a single array or a combination of a few arrays (after NMO is applied) is used to predict the type of processing needed for the longer group of detector arrays. One of the most effective methods is to take an autocorrelation of the data from the shorter group and then determine the uniform repetition time of the reflections, typical of multiple reflections. If the multiple reflections are close together as indicated by only small uniform intervals between the peaks of the autocorrelation curve, then the length of the deconvolution operator has a short time duration. If, however, there are only long time intervals between the repetitive peaks of the autocorrelation curve, such as one-half a second, then it is necessary for the deconvolution operator to have a long time interval, such as a little more than half a second. If repetitions have both short and long time intervals, then the deconvolution operator would require both closely spaced values and an extension over a long time interval. Thus, analysis of a limited amount of data determines the length and number of points in the deconvolution operator for the mass of data.

If steep dip is encountered on the data from the shorter group, then it is impractical to use the conventional Pie-slice or Fan-filter techniques (which combine data from a series of CRPs) with gates set only for near horizontal reflections. If steep dip is encountered in one direction only, then it would be possible to use Pie-slice or Fan-filters on data from the longer group; however, the series of dip gates would be centered about the dip encountered on data from the shorter group of detector arrays. This reduces the time required to search for both steep dips and slight dips in both directions throughout the large mass of data.

A further alternative includes recording both the shorter group and the longer group of detector arrays using the same low-cut (high pass) filter but with a higher frequency for the high-cut filter on the shorter group than on the longer group of detector arrays. For example, filter 202 in FIG. 5 may have a pass band of 5 to 300 Hz. If this is done, the monitor for the shorter group uses an additional low-cut (either analog or digital) filter to attenuate low-frequency noise for the monitor record. However, the data from several or all arrays in the short group may have had NMO applied and then be combined to eliminate the low-frequency noise rather than using filtering. The total length of the shorter group of detector arrays is comparable to the center-to-center distance between consecutive arrays in the longer group of detector arrays. The combination of these two groups will attenuate the low-frequency noise. The high-frequency signals will not be attenuated (except when very steep dip is encountered) since application of NMO brought the signals into coincidence before combination. Hence this combination of all of the arrays in the shorter group provides a wider frequency response than an array in the longer group of detector arrays. This broad pass band of frequencies can be used to determine the optimum filter which should be used for the deep reflections as well as the shallow reflections and whether a time varying filter should be applied to the subsequent processing of the data from the longer group of detector arrays. Considerable processing time can be saved by omitting processing programs that are redundant for the particular data being processed. This combined data from the shorter group also is indicative of whether higher frequencies would be useful on the data from the longer group of detector arrays in a given area. If so, the frequency response and sampling of the data from the longer group is changed where indicated. The preceding is one alternative form of the invention.

The shorter group provides better identification of bubble collapse and oscillation of the seismic source. Such bubble collapse and oscillation is hard to identify on low-frequency records where the time between the source and the collapse is short. This collapse is readily observed on the autocorrelation of the data from the shorter group. The identification and determination of the characteristics of the bubble oscillation are useful not only in subsequent processing of the data from the longer group but also in planning a procedure to reduce this oscillation at the seismic source or at least shifting the frequency outside the seismic frequency pass band of the recording system.

Those skilled in the art will recognize other modifications of the apparatus and method. While preferred embodiments of the invention have been shown and described, it will be apparent that changes may be made without departing from the principles and spirit of the invention, the scope of which is defined by the appended claims. Accordingly, the foregoing embodiments are to be considered illustrative only, rather than restrictive of the invention, and those modifications which come within the meaning and range of equivalency of the claims are to be included.

Having thus described the invention, what is claimed as new and desired to be secured by Letters Patent is:

1. A method for obtaining seismic reflection signals, comprising the steps of:
   a. locating first and second group of seismic detectors along a traverse to respectively provide high and low multiplicity of coverage
   b. said first group including $N_1$ detectors with a detector interval of $D_1$ and said second group including $N_2$ detectors with a detector interval of $D_2$,
   c. determining the multiplicity of coverage $M_1$ of said first group and $M_2$ of said second group in accordance with the formula,
   $$N_1 \times D_1/M_1 = N_2 \times D_2/M_2 \text{ and}$$
   d. simultaneously recording seismic signals from said first and second group of detectors successively from seismic sources at different locations.

2. A method as in claim 1 wherein said first group of detectors is located more remotely from a seismic source than said second group of detectors.

3. A method as in claim 1 wherein the seismic reflection signals received from said second group of detectors are passed through a higher frequency band-pass filter than the seismic reflection signals from said first group of detectors prior to recording said seismic signals.

4. A method as in claim 1 wherein the seismic signals from said second group of detectors are sampled more frequently than the seismic signals received from said first group of detectors 5. A method as in claim 1 wherein said first and second groups of detectors are located successively along a single marine cable.

6. A method as in claim 1 wherein said first and second groups of detectors are respectively located on at least two cables.

7. A method as in claim 1 wherein the multiplicity of coverage of said first group of detectors is higher than the multiplicity of coverage of said second group of detectors.

8. Apparatus for obtaining seismic reflection signals, comprising:
   first and second groups of seismic detectors located successively along a traverse to respectively provide high and low multiplicity of coverage,
   said first group including $N_1$ detectors with a detector interval of $D_1$ and said second group including $N_2$ detectors with a detector interval of $D_2$,
   said first group and said second group of detectors respectively providing $M_1$ and $M_2$ multiplicity of coverage in accordance with the formula,
   $$N_1 = D_1/M_1 = N_2 \times D_2/M_2$$
   and means for individually recording the seismic signals from said first and second groups of detectors.

9. Apparatus as in claim 8 wherein said first group of detectors are located more remotely from a seismic source than said second group of detectors.

10. Apparatus as in claim 8 further comprising first and second frequency band-pass filters and said second frequency band-pass filter has a higher frequency band-pass than said first frequency band-pass filter, said first and second filters respectively filtering the seismic signals from said first and second groups of detectors.

11. Apparatus as in claim 8 further comprising means for sampling the seismic signals received by said first and second groups of seismic detectors and wherein the sampling rate is higher for the seismic signals from said second group of detectors than from said first group of detectors.

12. Apparatus as in claim 8 wherein said first and second groups of detectors are successively located along a single marine cable.

13. Apparatus as in claim 8 wherein said first and second groups of detectors are located along at least two marine cables.

UNITED STATES PATENT OFFICE

CERTIFICATE OF CORRECTION

Patent No. 3,613,071         Dated  October 12, 1971

Inventor(s) Roy G. Quay

It is certified that error appears in the above-identified patent and that said Letters Patent are hereby corrected as shown below:

Column 1, line 54, "of" should read --if--; Column 1, line 67, "low-frequency" should read --changes--; Column 2, line 39, "12" should read --1a--; Column 2, line 61, "24" should read --34--; Column 3, line 60, "reflections" should read --reflection--; Column 4, line 35, "the detector locations" should read --the spacing of the detector locations--; Column 4, line 46, "sued" should be --used--; Column 4, line 67, "st" should be omitted; Column 7, line 54, "group" should read --group.--; Column 7, line 57, "6 $D_1/2$" should read --$6 \times D_1/2$--; Column 10, line 61, "$N_1=D_1/M_1$" should read --$N_1 \times D_1/M_1$--.

Signed and sealed this 18th day of April 1972.

(SEAL)
Attest:

EDWARD M. FLETCHER, JR.           ROBERT GOTTSCHALK
Attesting Officer                 Commissioner of Patents